(12) United States Patent
Kumagai et al.

(10) Patent No.: US 7,314,230 B2
(45) Date of Patent: Jan. 1, 2008

(54) KNEEBAG AND OCCUPANT LEG PROTECTION SYSTEM

(75) Inventors: Masayoshi Kumagai, Ika-gun (JP); Kazuhiro Abe, Berlin (DE); Masatoshi Kawauchimaru, Shiga (JP)

(73) Assignee: Takata Corporation, Tokyo (JP)

( * ) Notice: Subject to any disclaimer, the term of this patent is extended or adjusted under 35 U.S.C. 154(b) by 221 days.

(21) Appl. No.: 11/002,250

(22) Filed: Dec. 3, 2004

(65) Prior Publication Data

US 2005/0134024 A1  Jun. 23, 2005

(30) Foreign Application Priority Data

Dec. 19, 2003  (JP)  ............... 2003-423069

(51) Int. Cl.
*B60R 21/231* (2006.01)

(52) U.S. Cl. ................. 280/730.1; 280/743.2
(58) Field of Classification Search ............. 280/728.1, 280/730.1, 732, 743.2, 752
See application file for complete search history.

(56) References Cited

U.S. PATENT DOCUMENTS

| 4,360,223 | A | 11/1982 | Kirchoff |
| 6,155,595 | A | 12/2000 | Schultz |
| 6,302,437 | B1 | 10/2001 | Marriott et al. |
| 6,305,710 | B1 | 10/2001 | Bosgieter et al. |
| 6,471,242 | B2 | 10/2002 | Schneider |
| 6,536,802 | B1 | 3/2003 | Sutherland et al. |
| 6,685,217 | B2 | 2/2004 | Abe |
| 2002/0171232 | A1* | 11/2002 | Abe ........................ 280/730.1 |
| 2003/0094795 | A1* | 5/2003 | Takimoto et al. ........ 280/730.1 |
| 2003/0107206 | A1* | 6/2003 | Takimoto et al. ........ 280/730.1 |
| 2003/0120409 | A1* | 6/2003 | Takimoto et al. ............ 701/45 |
| 2003/0184069 | A1* | 10/2003 | Takimoto et al. ........ 280/743.1 |
| 2004/0164527 | A1* | 8/2004 | Nagata et al. ........... 280/730.1 |

FOREIGN PATENT DOCUMENTS

EP  1 310 408  5/2003

\* cited by examiner

*Primary Examiner*—Paul N. Dickson
*Assistant Examiner*—Leonard McCreary, Jr.
(74) *Attorney, Agent, or Firm*—Manabu Kanesaka

(57) ABSTRACT

A kneebag is arranged to be inflated upwardly from below in front of legs of an occupant in a vehicle. In an inflated state, the kneebag has a thickness at an upper portion thereof larger than that of a middle portion in a vertical direction of the kneebag except left and right side portions thereof.

8 Claims, 4 Drawing Sheets

US 7,314,230 B2

KNEEBAG AND OCCUPANT LEG PROTECTION SYSTEM

BACKGROUND OF THE INVENTION AND RELATED ART STATEMENT

The present invention relates to a knee airbag or kneebag for restraining knees of an occupant so that a lower body of the occupant does not move toward a front side of a vehicle to prevent lower legs of the occupant from striking against an interior panel in front of a seat in an event of a collision of the vehicle, and also relates to an occupant leg protection system including the kneebag.

As an occupant leg protection system for protecting lower legs of an occupant from striking against an interior panel in front of a seat and from receiving a large load in an event of a head-on collision of a high-speed vehicle such as a car, there has been a system including a kneebag to be inflated in front of the occupant legs and an inflator (gas generator) for inflating the kneebag.

Japanese Patent Publication (Kokai) No. 11-321539 has disclosed an occupant leg protection system in which a kneebag is inflated in a region of an instrument panel facing occupant knees, so that the inflated kneebag receives the occupant knees, thereby restraining a forward movement of the occupant body. When the inflated kneebag receives the occupant knees in such a way, it is possible to prevent the forward movement of the occupant body effectively.

In general, a glove box (glove compartment) and the like is provided in a region of an instrument panel at a height facing the occupant knees. Accordingly, it is sometimes difficult to dispose an occupant leg protection system in the region. Accordingly, an occupant leg protection system may be disposed below the region (height lower than the region facing the occupant knees), so that a kneebag is inflated upwardly from below to deploy toward the height facing the occupant knees.

However, in such a structure, it is necessary to inflate the kneebag upwardly from below over a relatively long distance from a height lower than the occupant knees to a height facing the knees, thereby making the kneebag large. It is also necessary to use a high-output inflator to inflate the large kneebag quickly.

In view of the problems described above, an object of the present invention to provide a kneebag to be quickly inflated upwardly from below without a high-output inflator, and an occupant leg protection system including the kneebag.

Further objects and advantages of the invention will be apparent from the following description of the invention.

SUMMARY OF THE INVENTION

In order to attain the objects described above, according to a first aspect of the present invention, a kneebag is to be inflated upwardly from below in front of legs of an occupant in a vehicle. In an inflated state, the kneebag has a thickness at an upper portion thereof larger than that of a middle portion in a vertical direction of the kneebag except left and right side portions thereof.

According to a second aspect of the present invention, in the kneebag of the first aspect, tethers are disposed in the kneebag in multistage for connecting a base fabric of the kneebag adjacent to the occupant and an opposite base fabric. The tethers extend continuously laterally, and vent spaces are formed between respective lateral ends of the tethers and lateral edges of the kneebag. The uppermost tether is located in the vicinity of a boundary between the upper portion and the middle portion of the kneebag in the vertical direction. The uppermost tether has a length C in a thickness direction of the kneebag smaller than a half of a length A of the knee-airbag base fabric from a connected portion between the uppermost tether and the base fabric adjacent to the occupant to a connected portion between the uppermost tether and the opposite base fabric around an upper rim of the kneebag (C<½A). Further, the length C is smaller than a half of a length B of the knee-airbag base fabric surrounding the vent space from a connected portion between the lateral end of the uppermost tether and the base fabric adjacent to an occupant to a connected portion between the opposite lateral end of the uppermost tether and the opposite base fabric around a side of the kneebag (C<½B).

According to a third aspect of the present invention, an occupant leg protection system includes the kneebag according to the present invention and an inflator for inflating the kneebag.

In the kneebag and the occupant leg protection system according to the present invention, the inflated kneebag has the thickness at the upper portion larger than that at the middle portion of the kneebag in the vertical direction. In other words, the thickness of the kneebag is smaller at the middle portion of the kneebag in the vertical direction than the upper portion of the kneebag. Accordingly, when the kneebag is inflated, the middle portion of the kneebag in the vertical direction is quickly inflated upwardly from below, and the upper portion of the kneebag is deployed quickly in front of the occupant knees without a high-output inflator. The upper portion of the inflated kneebag has a sufficient thickness across a lateral width thereof.

According to the invention, preferably, the tethers are disposed in the kneebag in multistage for connecting the base fabric of the kneebag adjacent to the occupant and the opposite base fabric. The tethers extend continuously laterally, and the vent spaces are formed between the respective lateral ends of the tethers and the lateral edges of the kneebag. The uppermost tether is located in the vicinity of the boundary between the upper portion and the middle portion of the kneebag in the vertical direction. The uppermost tether has a length C in a thickness direction of the kneebag smaller than a half of a length A of the knee-airbag base fabric from a connected portion between the uppermost tether and the base fabric adjacent to the occupant to a connected portion between the uppermost tether and the opposite base fabric around an upper rim of the kneebag (C<½A). Further, the length C is smaller than a half of a length B of the knee-airbag base fabric surrounding the vent space from a connected portion between the lateral end of the uppermost tether and the base fabric adjacent to an occupant to a connected portion between the opposite lateral end of the uppermost tether and the opposite base fabric around a side of the kneebag (C<½B).

With such a structure, in an inflated state, the upper portion of the kneebag has a sufficient thickness while the middle portion of the kneebag in the vertical direction is thinner than the upper portion of the kneebag.

DETAILED DESCRIPTION OF PREFERRED EMBODIMENTS

Figure 1:
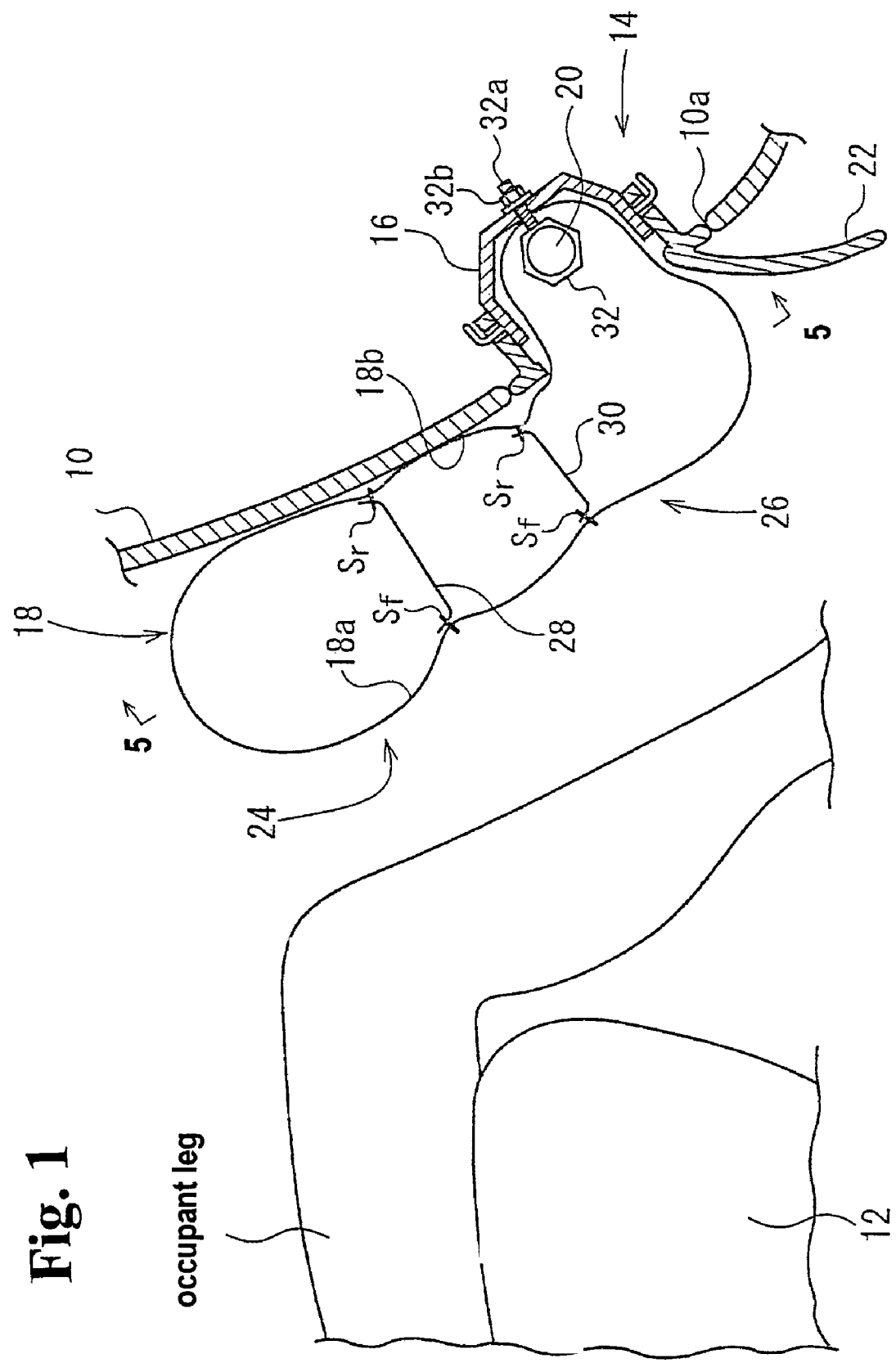
FIG. 1 is a cross-sectional view of the vicinity in front of a vehicle seat showing an inflated state of a kneebag according to an embodiment of the present invention.
Figure 2:
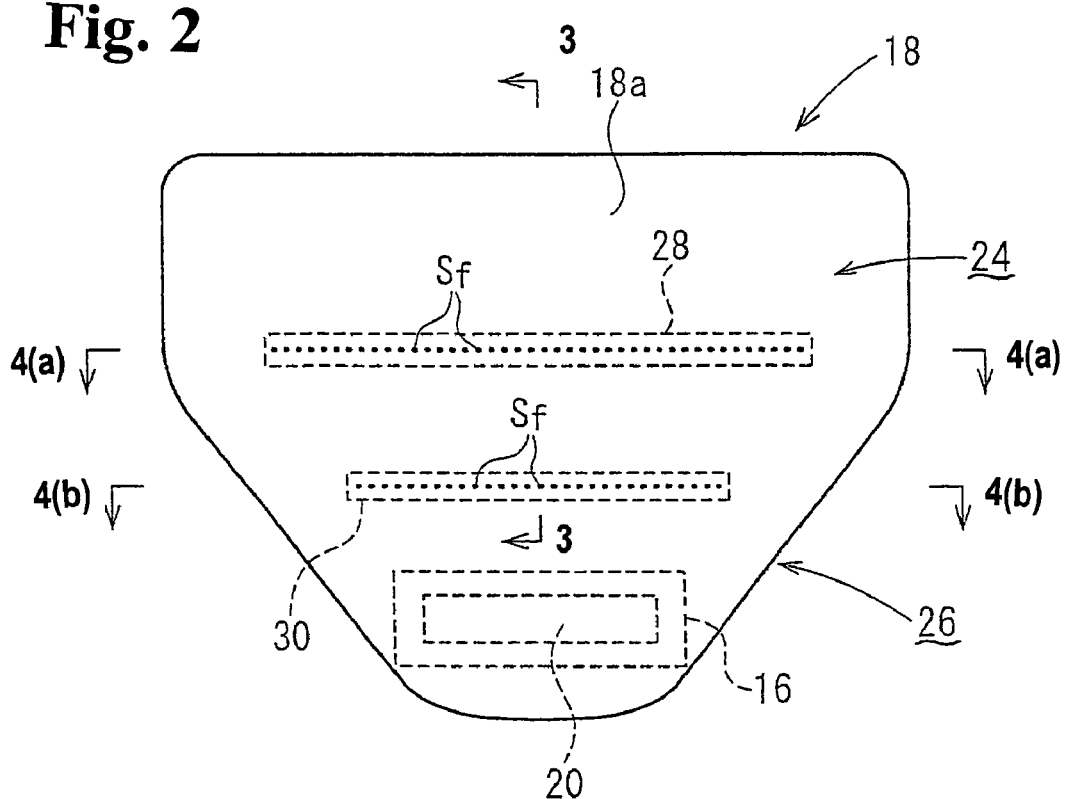
FIG. 2 is a front view of the kneebag in an inflated state.
Figure 3:
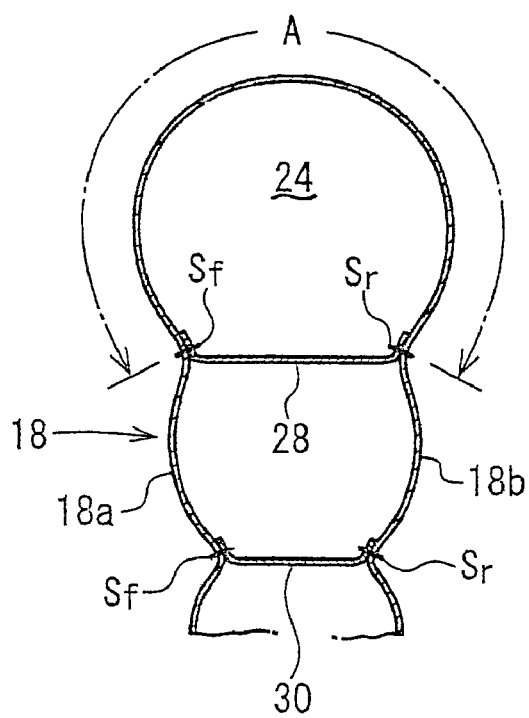
FIG. 3 is a cross-sectional view taken along line 3-3 in FIG. 2.
Figure 4A:
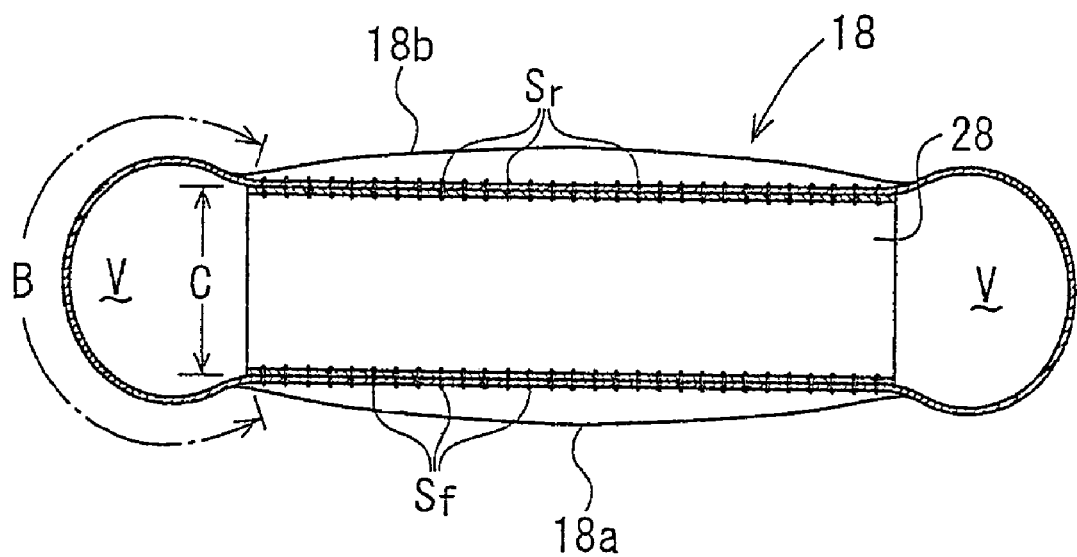
FIGS. 4(a) and 4(b) are cross-sectional views taken along line 4(a)-4(a) and line 4(b)-4(b) in FIG. 2, respectively.
Figure 4B:
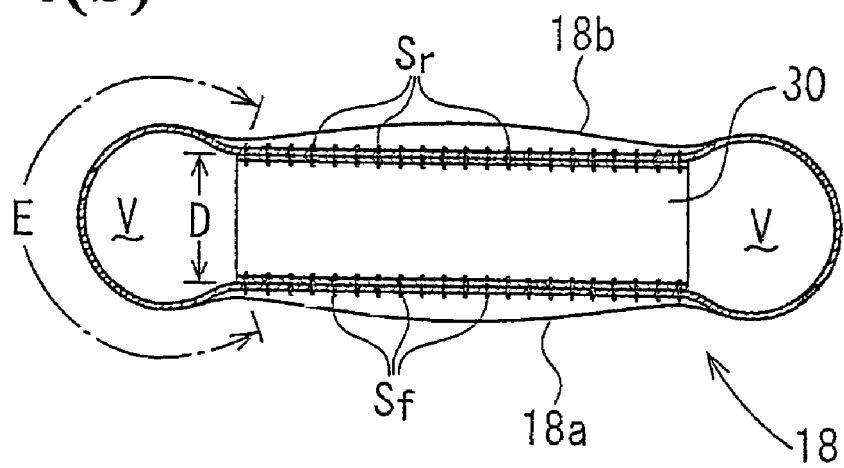
Figure 5:
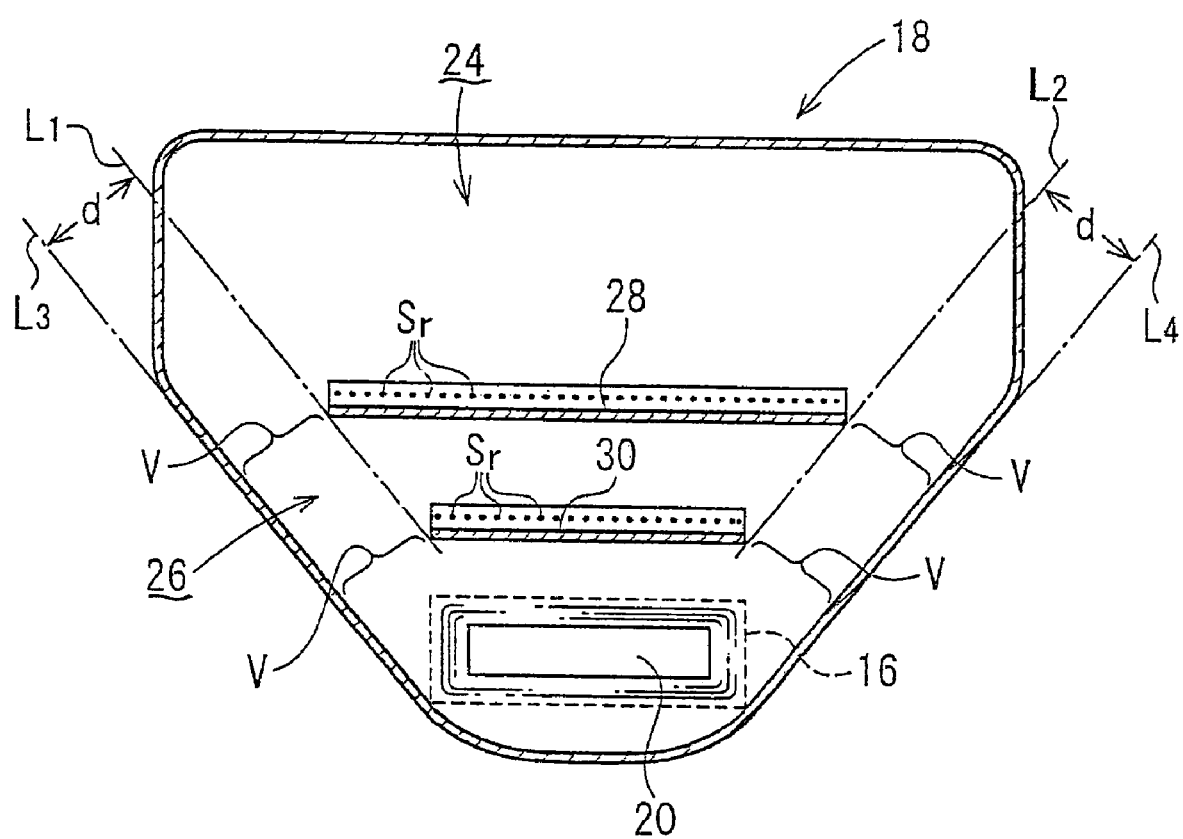
FIG. 5 is a cross-sectional view taken along line 5-5 in FIG. 1.

Hereunder, embodiments of the present invention will be described with reference to the accompanying drawings. FIG. 1 is a cross-sectional view of the vicinity in front of a vehicle seat showing an inflated state of a kneebag according to an embodiment of the present invention. FIG. 2 is a front view of the kneebag in an inflated state. FIG. 3 is a cross-sectional view taken along line 3-3 in FIG. 2. FIGS. 4(a) and 4(b) are cross-sectional views taken along line 4(a)-4(a) and line 4(b)-4(b) in FIG. 2, respectively. FIG. 5 is a cross-sectional view taken along line 5-5 in FIG. 1. In the following description, a lateral direction is a direction along a width of a vehicle.

An occupant leg protection system 14 is mounted to an interior panel 10 in front of a seat 12. The occupant leg protection system 14 includes a container-like retainer 16 with an open front surface (surface adjacent to an occupant), a kneebag 18 connected to the retainer 16, and an inflator (gas generator) 20 for inflating the kneebag 18. The retainer 16 is disposed in an opening 10a of the interior panel 10. The kneebag 18 is accommodated in the retainer 16 normally in a folded state. A lid 22 is attached to the front surface of the retainer 16 for covering the folded kneebag 18. The lid 22 is usually disposed so as to be substantially flush with the interior panel 10. As shown in FIG. 1, when the kneebag 18 is inflated, the lid 22 is open toward a front side of the interior panel 10 with a lower end thereof as a fulcrum.

As shown in FIG. 1, the opening 10a is provided below the seating surface of the seat 12. The kneebag 18 is inflated upwardly from below along the front surface (surface adjacent to the occupant) of the interior panel 10 through the opening 10a.

As shown in FIG. 2, according to the embodiment, an upper portion of the kneebag 18 constitutes an equal-width portion 24 having a substantially equal lateral width across a predetermined vertical width. A lower portion of the kneebag 18 below the equal-width portion 24 constitutes a narrow-width portion 26 having a lateral width decreasing toward a lower end. The lower end of the narrow-width portion 26 is connected to the retainer 16.

It is arranged such that the equal-width portion 24 is located above a seating surface of the seat 12 when the kneebag 18 is inflated upwardly from below along the front surface of the interior panel 10 through the opening 10a. Therefore, when the kneebag 18 is inflated in front of occupant legs, the equal-width portion 24 faces the vicinity of the knees of the occupant seated in the seat 12.

The lateral width of the equal-width portion 24 is preferably in the range from 500 mm to 600 mm. The lateral width of the front opening of the retainer 16 is preferably less than a half, particularly from 40% to 50%, of the width of the equal-width portion 24. As shown in FIG. 5, the narrow-width portion 26 preferably extends such that lateral edges thereof connect lateral edges of the equal-width portion 24 with lateral lower corners of the front opening of the retainer 16, respectively.

The kneebag 18 has tethers 28 and 30 disposed therein for connecting a front surface (base fabric adjacent to the occupant) 18a of the kneebag 18 and a rear surface (a base fabric adjacent to the interior panel 10) 18b in multistage in a vertical direction (two stages in the embodiment). Symbol Sf denotes seams connecting the tethers 28 and 30 with the front surface 18a, and symbol Sr denotes seams connecting the tethers 28 and 30 with the rear surface 18b. The upper tether 28 is disposed in the vicinity of a boundary between the equal-width portion 24 and the narrow-width portion 26 (preferably, in the range of 0 mm to 70 mm above or below the boundary between the equal-width portion 24 and the narrow-width portion 26 and, more preferably, in the range of 0 mm to 30 mm above or below). The lower tether 30 is disposed at an intermediate position of the narrow-width portion 26 in the vertical direction.

The tethers 28 and 30 extend in the lateral direction, and each of tethers is connected to the front surface 18a and the rear surface 18b across a predetermined lateral width. As shown in FIG. 5, respective lateral ends of the tethers 28 and 30 are separated from the lateral edges of the kneebag 18. Between the lateral ends of the tethers 28 and 30 and the lateral edges of the kneebag 18, vent spaces V are formed, respectively.

A length C of the upper tether 28 (length in a direction of connection between the front surface 18a and the rear surface 18b, the same applies to the following) is larger than that of the lower tether 30 (see FIGS. 4(a) and 4(b)). Accordingly, as shown in FIGS. 3, 4(a), and 4(b), a thickness of the inflated kneebag 18 is larger at the upper portion (equal-width portion 24) than at the middle portion (narrow-width portion 26) of the kneebag 18 in the vertical direction. In other words, the thickness of the kneebag 18 is smaller at the middle portion in the vertical direction than at the upper portion of the kneebag 18, and the thickness of the upper portion of the kneebag 18 is substantially equal and sufficient at most of a center portion of the kneebag 18 in a lateral direction except the lateral sides.

When the upper and lower tethers 28 and 30 are disposed in multistage to limit the thicknesses of the upper portion and the middle portion of the kneebag 18 during inflation, it is preferable to set the length C of the upper tether 28 in the range from 20 mm to 150 mm, more preferably, from 50 mm to 100 mm, and the length D of the lower tether 30 in the range from 10 to 130 mm, more preferably, from 30 mm to 90 mm. In this case, it is more preferable to set the length C of the upper tether 28 smaller than a half of a length A (see FIG. 3) of the base fabric of the kneebag 18 from the connected portion (seam Sf) between the tether 28 and the knee-airbag front surface 18a to the connected portion (seam Sr) between the tether 28 and the knee-airbag rear surface 18b around the upper rim of the kneebag 18 (C<½A). Also, the length C is preferably smaller than a half of a length B (see FIG. 4(a)) of the knee-airbag base fabric surrounding the vent space V at the lateral sides of the upper tether 28 (from the seam Sf at the lateral end of the tether 28 to the opposite seam Sr around a side of the kneebag 18; C<½B).

Also, it is more preferable to set a length D of the lower tether 30 smaller than the length C of the tether 28 (C>D), and set the length B of the knee-airbag base fabric larger than a length E of the knee-airbag base fabric surrounding the vent space V on the lateral sides of the lower tether 30 (from the seam Sf at the lateral end of the tether 30 to the opposite seam Sr around the side of the kneebag 18; B>E; see FIG. 4(b)).

With such a structure, in an inflated state, the upper portion of the kneebag has a sufficient thickness while the middle portion of the vertical direction of the kneebag is thinner than the upper portion of the kneebag. A cross section of a flow channel of each vent space V is preferably in the range from 3,000 mm$^2$ to 7,850 mm$^2$, more preferably from 4,500 m² to 5,500 mm². In this case, an interval (shortest distance) between the respective lateral ends of the tethers 28 and 30 and the lateral edges of the kneebag 18 is preferably in the range from 80 mm to 130 mm, more preferably from 90 mm to 120 mm.

In this case, particularly as shown in FIG. 5, a line L1 connecting between the left ends of the tethers 28 and 30 and a line L2 connecting between the right ends thereof are in parallel to lines L3 and L4 extending along the lateral edges of the narrow-width portion 26, respectively. A distance d between the lines L1 and L3 and between the lines L2 and L4 is preferably in the range from 80 mm to 130 mm, more preferably from 90 mm to 120 mm. With such a structure, gas from the inflator 20 flows quickly in an upward direction along the lateral edges of the narrow-width portion 26 through the vent spaces V.

In the invention, a diffuser may be disposed in the kneebag 18 for laterally directing gas from the inflator 20. With such a structure, gas from the inflator 20 flows more efficiently along the lateral edges of the narrow-width portion 26. The inflator 20 in the embodiment is formed in a rod shape and disposed in the narrow-width portion 26 such that a longitudinal direction thereof is aligned with the lateral direction. The inflator 20 is mounted to an inflator holder 32. The inflator holder 32 includes a base portion and a band portion for fixing the inflator 20 to the base portion (the reference numerals are omitted). Stud bolts 32a project from the base portion.

The stud bolts 32a are inserted into bolt insertion holes (reference numeral omitted) provided in the rear surface 18b at the lower end of the narrow-width portion 26 to project to a backside of the kneebag 18 (opposite to the occupant), and are further inserted into bolt insertion holes (reference numeral omitted) provided in the retainer 16. Nuts 32b are fastened to the stud bolts 32a, so that the inflator holder 32 is fixed in the retainer 16, and the rear surface 18b at the lower end of the narrow-width portion 26 is retained between the inflator holder 32 and the retainer 16.

When a vehicle equipped with the occupant leg protection system 14 with such a structure collides at the front, the inflator 20 emits gas to inflate the kneebag 18. The kneebag 18 pushes the lid 22 open, and is inflated in front of the interior panel 10 upwardly along the interior panel 10. The equal-width portion 24 at the upper portion of the inflated kneebag 18 faces the vicinity of the occupant knees to receive them.

In the occupant leg protection system 14, the thickness of the inflated kneebag 18 is larger at the upper portion (equal-width portion 24) than at the middle portion of the vertical direction (narrow-width portion 26) of the kneebag 18, or the thickness of the kneebag 18 is smaller at the middle portion of the vertical direction than at the upper portion of the kneebag 18. Accordingly, when the kneebag 18 is inflated, the middle portion of the kneebag 18 in the vertical direction is quickly inflated upwardly from below, and the upper portion of the kneebag 18 is deployed quickly in front of the occupant knees without a high-output inflator. The upper portion (equal-width portion 24) of the inflated kneebag 18 has a substantially equal and sufficient thickness across the width. Accordingly, when the occupant knees strike against the upper portion of the kneebag 18, it is possible to stop the forward movement of the occupant knees sufficiently.

According to the embodiment, the kneebag 18 has a shape in which the lower narrow-width portion 26 has a smaller lateral width at the lower portion thereof, or an upwardly expanding shape. The inflator 20 is disposed at the lower end of the narrow-width portion 26, and gas flows upwardly through the vent spaces V between the lateral ends of the upper and lower tethers 28 and 30 and the lateral edges of the narrow-width portion 26. Therefore, when the kneebag 18 is inflated, the narrow-width portion 26 is inflated first while expanding upwardly and laterally. Then, the equal-width portion 24 above the narrow-width portion 26 is inflated to extend laterally so as to connect the inflated portions of the lateral sides of the narrow-width portion 26 together. Afterward, the vicinity of the center of the kneebag 18 is inflated.

The upper tether 28 is disposed in the vicinity of the boundary between the equal-width portion 24 and the narrow-width portion 26 and has a large lateral width. The equal-width portion 24 has a relatively small volume, so that the equal-width portion 24 is inflated quickly. Accordingly, the lateral sides and the upper equal-width portion 24 of the kneebag 18 are inflated quickly, so that the kneebag 18 is quickly inflated laterally and upwardly.

In this embodiment, the flow-channel cross-sectional area of the vent spaces V between the respective lateral ends of the tethers 28 and 30 and the lateral edges of the narrow-width portion 26 is in the range from 3,000 mm² to 7,850 mm². Accordingly, gas flows quickly in an upward direction in the vent spaces V, thereby inflating the kneebag 18 extremely quickly.

The above-described embodiments are only examples of the invention, and the invention is not limited thereto.

The disclosure of Japanese Patent Application No. 2003-423069, filed on Dec. 19, 2003, is incorporated in the application.

While the invention has been explained with reference to the specific embodiments of the invention, the explanation is illustrative and the invention is limited only by the appended claims.

What is claimed is:

1. A kneebag to be inflated upwardly from below in front of legs of a vehicle occupant, comprising:

an upper portion having a substantially rectangular shape when viewed in front and a first thickness in an inflated state, a middle portion below the upper portion in a vertical direction having a generally triangular shape oriented downwardly when viewed in front, said middle portion extending downwardly from the upper portion with the rectangular shape to gradually reduce lateral length thereof and having a second thickness in the inflated state, said second thickness being smaller than the first thickness except for lateral end portions of the kneebag, a lower end portion located at a bottom of the middle portion, an upper tether located at a boundary between the upper portion and the middle portion to have vent spaces at two lateral sides thereof, and a lower tether located between the upper tether and the lower end portion to form a narrow width portion with respect to the upper tether and having a lateral length shorter than that of the upper tether to have vent spaces at two lateral sides thereof, said vent spaces of the upper and lower tethers being formed obliquely between respective lateral ends of the upper and lower tethers and lateral edges of the kneebag, said vent spaces being substantially constant so that gas supplied at the lower end portion first flows obliquely upwardly to the upper portion through the vent spaces along the lateral edges formed with the triangular shape to thereby inflate the vent spaces and the narrow width portion upwardly; and then, the upper portion is inflated from two lateral sides thereof by the gas supplied from the vent spaces.

2. A kneebag according to claim 1, wherein said upper and lower tethers are connected between a front side of the kneebag and a rear side thereof.

3. A kneebag according to claim 2, wherein said upper tether has a first length in a thickness direction of the kneebag smaller than a half of a second length of the kneebag extending from a connected portion between the upper tether and the front side adjacent to the occupant to a connected portion between the upper tether and the rear side passing through an upper rim of the kneebag, said first length being smaller than a half of a third length surrounding one vent space from a connected end between a lateral front end of the upper tether and the front side adjacent to the occupant to a connected end between a lateral rear end of the upper tether and the rear side passing through a side of the kneebag.

4. An occupant leg protection system comprising the kneebag according to claim 1 and an inflator for inflating the kneebag.

5. An occupant leg protection system according to claim 4, wherein said lower end portion has a lateral size to receive the inflator therein so that the gas from the inflator is quickly lead laterally upwardly along the lateral edges formed with the triangular shape.

6. A kneebag according to claim 1, wherein said upper tether has a length in a thickness direction longer than that of the lower tether so that thickness of the kneebag is gradually increased from the lower end portion to the upper portion when inflated.

7. A kneebag according to claim 1, wherein a distance forming the vent space, extending from the lateral end of the upper tether to the lateral edge of the knee bag nearest to said lateral end of the upper tether is generally same as a distance forming the vent space, extending from the lateral end of the lower tether to the lateral edge of the knee bag nearest to said lateral end of the lower tether, to thereby form the vent space generally constant.

8. A kneebag to be inflated upwardly from below in front of legs of a vehicle occupant, comprising:

an upper portion having a first thickness in an inflated state, a middle portion below the upper portion in a vertical direction having a second thickness in the inflated state, said second thickness being smaller than the first thickness except for lateral end portions of the kneebag, and a plurality of tethers disposed in the kneebag to be spaced apart from each other in a vertical direction and extending continuously laterally for connecting a front side of the kneebag adjacent to the occupant and a rear side thereof such that vent spaces are formed between respective lateral ends of the tethers and lateral edges of the kneebag, wherein an uppermost tether in the plurality of tethers has a first length in a thickness direction of the kneebag between 20 and 150 mm, and a lower tether lower than the uppermost tether in the plurality of tethers has a length in the thickness direction less than that of the uppermost tether and between 10 and 130 mm, total area of the vent spaces formed on two sides of the tethers is between 3000 and 7850 mm$^2$, and said uppermost tether is located close to a boundary between the upper portion and the middle portion, the first length of the uppermost tether being smaller than a half of a second length of the kneebag extending from a connected portion between the uppermost tether and the front side adjacent to the occupant to a connected portion between the uppermost tether and the rear side passing through an upper rim of the kneebag, said first length being smaller than a half of a third length surrounding one vent space from a connected end between a lateral front end of the uppermost tether and the front side adjacent to the occupant to a connected end between a lateral rear end of the uppermost tether and the rear side passing through a side of the kneebag.

* * * * *